United States Patent [19]
Levesque et al.

[11] Patent Number: 5,928,608
[45] Date of Patent: Jul. 27, 1999

[54] INTERMITTANT SPRAY SYSTEM FOR WATER TREATMENT

[75] Inventors: Kenneth John Levesque, Bristol; Richard M. Mullins, Madison, both of Conn.; Rocco Telese, Chicago, Ill.; David W. Blanchette, Southington, Conn.

[73] Assignee: Arch Chemicals Inc., Norwalk, Conn.

[21] Appl. No.: 09/004,677

[22] Filed: Jan. 8, 1998

[51] Int. Cl.$^6$ .................................................. B01D 11/02
[52] U.S. Cl. ..................... 422/37; 210/97; 210/205; 210/754; 210/756; 222/320; 422/110; 422/111; 422/261; 422/263; 422/264; 422/278
[58] Field of Search .................... 422/264, 261, 422/263, 266, 278, 37, 110, 108, 111; 210/754, 756, 97, 205; 222/320; 137/2, 5, 47, 268

[56] References Cited

U.S. PATENT DOCUMENTS

| | | | |
|---|---|---|---|
| 4,250,911 | 2/1981 | Kratz | 137/268 |
| 4,426,362 | 1/1984 | Copeland et al. | 422/263 |
| 4,462,511 | 7/1984 | Fulmer et al. | 222/52 |
| 4,690,305 | 9/1987 | Copeland | 222/52 |
| 4,858,449 | 8/1989 | Lehn | 68/12 |
| 4,964,185 | 10/1990 | Lehn | 8/158 |
| 5,147,615 | 9/1992 | Bird et al. | 422/261 |
| 5,183,206 | 2/1993 | Gavin | 239/317 |
| 5,229,084 | 7/1993 | Livingston et al. | 422/278 |
| 5,262,613 | 11/1993 | Bricker et. al. | 422/278 |
| 5,268,153 | 12/1993 | Muller | 422/263 |
| 5,310,430 | 5/1994 | McCall, Jr. | 134/33 |
| 5,374,119 | 12/1994 | Scheimann | 366/101 |
| 5,389,344 | 2/1995 | Copeland et al. | 422/264 |
| 5,393,502 | 2/1995 | Miller et al. | 422/261 |
| 5,413,280 | 5/1995 | Taylor | 239/10 |
| 5,427,748 | 6/1995 | Wiedrich et al. | 422/264 |
| 5,441,711 | 8/1995 | Drewery | 422/264 |

*Primary Examiner*—Krisanne Thornton
*Attorney, Agent, or Firm*—William A. Simons; Thomas F. Presson; Wiggin & Dana

[57] ABSTRACT

Swimming pool or drinking water is chlorinated by the use of an intermittent spray-type chlorinator assembly. The chlorinator assembly includes a chamber for holding a quantity of solid dry chlorinating chemical, typically in the form of briquettes or pellets. The water spray impacts, abrades, and dissolves the briquettes to a degree, and at a rate which is controlled by the velocity of the spray; the diameter of the support grid; the percentage of open space in, and the thickness of the support grid; and the cyclic timing of the spray. The chemical-water mixture falls into a chamber below the spray and is evacuated therefrom through discharge/check valve assembly to a return line that leads back to the source of the water being chlorinated. The spray duration times and the intervals therebetween can be selectively changed by an attendant. By using a water spray technique for periodically abrading and dissolving the chemical briquettes, a highly soluble solid chemical such as calcium hypochlorite can be used as the water treatment chemical. Additionally, intermittent spraying limits the buildup of scale in the system.

16 Claims, 5 Drawing Sheets

INTERMITTANT SPRAY SYSTEM FOR WATER TREATMENT

BACKGROUND OF THE INVENTION

1. Field of the Invention

This invention relates to a system for sanitizing swimming pools and other water supplies; and more particularly to a system for periodically intermittently spraying water against a supply of a solid relatively highly soluble chlorinating chemical agent, such as calcium hypochlorite, so as to dissolve the chemical into a water-chlorine solution which is recirculated back into the water supply. Periodic intermittent spraying of the water stream against the solid chemical ensures that a reproducible target aqueous concentration of chlorine is attained by the system at each intermittent spraying. Intermittent spraying also reduces the formation of calcium carbonate scale in the system, and therefore lessens the frequency and cost of system maintenance.

2. Description of the Art

Assemblies for sanitizing a water supply, such as swimming pool water or drinking water, typically utilize a solid chlorinating chemical which is disposed in a chlorinating assembly that is in constant communication with the water. Water from the water supply is periodically fed into the chlorinating assembly and passively resides therein so as to dissolve a portion of the solid chemical. The water-chemical solution passes from the chlorinating assembly back into the water supply. The flow of water from the water supply into the chlorinating assembly is periodically interrupted and then recommenced so as to deliver periodic infusions of the chlorinating solution to the water supply.

U.S. Pat. No. 4,690,305 (Copeland) discloses a solid block chemical dispenser for cleaning systems. This system has an upper cylindrical storage portion and a lower funnel shaped collector portion. A chemical dispenser, support screen and chemical holder are integral with the housing unit. The chemical dispenser does not include any regulating valves or solenoids.

U.S. Pat. No. 4,250,911 (Kratz) discloses a chemical feeder for a liquid circulating system. Water enters from a side port and rises into the container to dissolve a chlorine source. The system does not utilize spray nozzles.

The aforesaid static chlorinating systems are prone to calcium carbonate scaling that plates out on the chemical container and on a support grid that supports the solid chemical. System scaling must be periodically removed or else the system will malfunction. Servicing of such static systems must be performed frequently, and in certain cases, approximately biweekly in order to ensure proper operation of the system. Additionally, and more importantly, static chlorinating systems are not eminently suitable for use with relatively highly soluble solid chlorinating chemicals, such as calcium hypochlorite.

It would be desirable to provide a water sanitizing system that does not require time-consuming and unduly frequent servicing in order to ensure proper operation. Furthermore, it would be highly desirable to provide such a water sanitizing system that is able to employ a relatively highly soluble solid chlorinating chemical, such as calcium hypochlorite, for supplying chlorine to the water supply being treated.

SUMMARY OF THE INVENTION

The cycling of water flow into the sanitizing system can be automatically or manually controlled. For automatic control, a chlorine-concentration sensor can be exposed to an exiting chlorinated water stream so as to monitor the chlorine concentration in the exiting water stream. The sensor controls the flow of water thought the sanitizer by means of valves so that water is only recirculated through the sanitizer when the chlorine concentrating in the water needs to be increased. For manual control, one can analyze the chlorine concentrating in the water supply, and when low, can manually repeat the sanitizing cycle until the chlorine concentration rises to acceptable levels.

It is a further object of this invention to provide a water chloriantion system that allows use of relatively highly soluble solid water treatment chemical agents.

It is a further object of this invention to provide a water treatment system of the character described wherein a solid water treatment chemical is subjected to a water spray so as to abrade and dissolve the chemical in water.

It is another object of this invention to provide a water treatment system of the character described wherein the water spray is periodically activated and deactivated.

It is an additional object of this invention to provide a water treatment system of the character described wherein activating of the water spray can be controlled by a chlorine sensor that monitors the chlorinated water stream flowing through the system.

These and other objects and advantages of the invention will become more readily apparent from the following detailed description of a preferred embodiment of the invention when taken in conjunction with the accompanying drawings.

DETAILED DESCRIPTION

Figure 1:
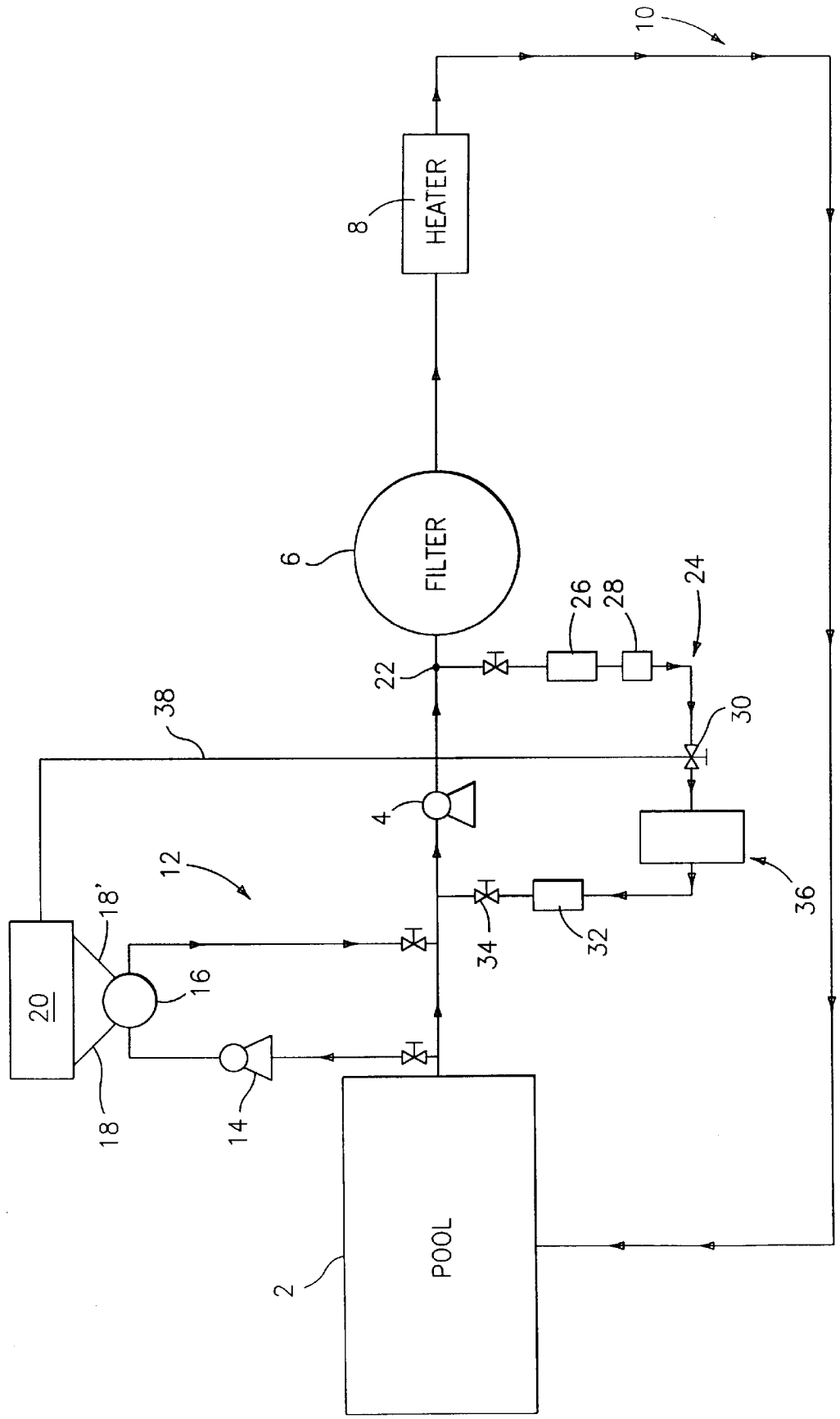
FIG. 1 shows a schematic view of an automatically controlled embodiment of a pool sanitizing system formed in accordance with this invention.

This invention relates to a water sanitizing system that utilizes a relatively highly soluble chlorinating chemical agent which is in solid form, and which is selectively dissolved by water flowing through the sanitizing system. By "highly soluble" we are referring to chlorinating chemical agents that have a solubility of at least about ten grams per hundred milliliters of water, and thus will rapidly dissolve, as compared to other chlorinating chemicals, such as trichloroisocyanuric acid, or bromochlorodimethylhydantoin, for example. The sanitizing system utilizes an intermittent water spray, which is directed against the chlorinating chemical. The use of the water spray results, in intermittent water-chemical contact through a porous grid that supports the solid chemical. The solid chemical is thus subjected to an intermittent spray of water that both abrades the chemical and dissolves surface areas on the chemical. The solid chemical can be in the form of briquettes, pellets, or other shapes which are sufficiently large so that they will not pass individually through the support grid. A primary advantage derived from the use of an intermittent spray to release the chemical from its solid form is that this type of delivery approach allows one to accurately control the degree of chlorinating of the water even when a relatively highly soluble chemical such as calcium hypochlorite, which has a solubility of about twenty eight grams per hundred milliliters of water, is used as the chlorinating agent. An additional advantage to the use of an intermittent spray to release the chemical stems from the fact that the container and the support grid are never passively submerged in the chemical solution during operation of the system thereby minimizing the rate at which scale will form in the system. By slowing down the rate of formation of scale e in the system, the need to service the system is less frequent than with the aforesaid passive pool water sanitizing systems.

The water spray will preferably be spaced apart from the chemical support grid a predetermined distance, and will be provided with an included angle such that the spray will impinge essentially one hundred percent of the support grid. The spacing and spray nozzle velocity will also be such that a minimum water spray chemical-impact velocity of about thirty feet per second will be obtained. The reason for maintaining a minimum water spray velocity is because the velocity of the water spray as it impinges the solid chemical should be such that the desired rate of dissolution of the chemical will be ensured. In small water sanitizing systems, a single properly configured spray nozzle can provide the desired one hundred percent support grid coverage with the proper impact velocity. In larger sanitizing systems, a plurality of spray nozzles may be desirable. In such larger systems it will be more desirable to use a plurality of smaller spray nozzles which will be deployed in a pattern that will result in the desired one hundred percent grid coverage. The use of several smaller diameter sprays in the larger sanitizing systems will allow placement of the sprays closer to the grid than one larger spray nozzle will allow. A closer nozzle placement, given the same water pressure, will result in higher grid and chemical impingement velocities by the water spray.

Additional consideration must be given to the weight of the solid chemical mass, which must be supported by the grid. In large swimming pools, or the like water supplies, the use of a single sanitizer assembly must possess the ability to employ a larger volume of solid chemical, which will obviously be heavier than the chemical volume employed in a system which is designed to service a smaller pool, spa or the like. In larger sanitizing systems, the gird used to support the chemical mass will have to be stronger and therefore thicker. When a thicker grid is employed, the openings in the grid should be larger than with a thinner grid, due to the need to enable the fringe of the water spray to directly impinge the chemical through the fringe portions of the grid.

Figure 2:
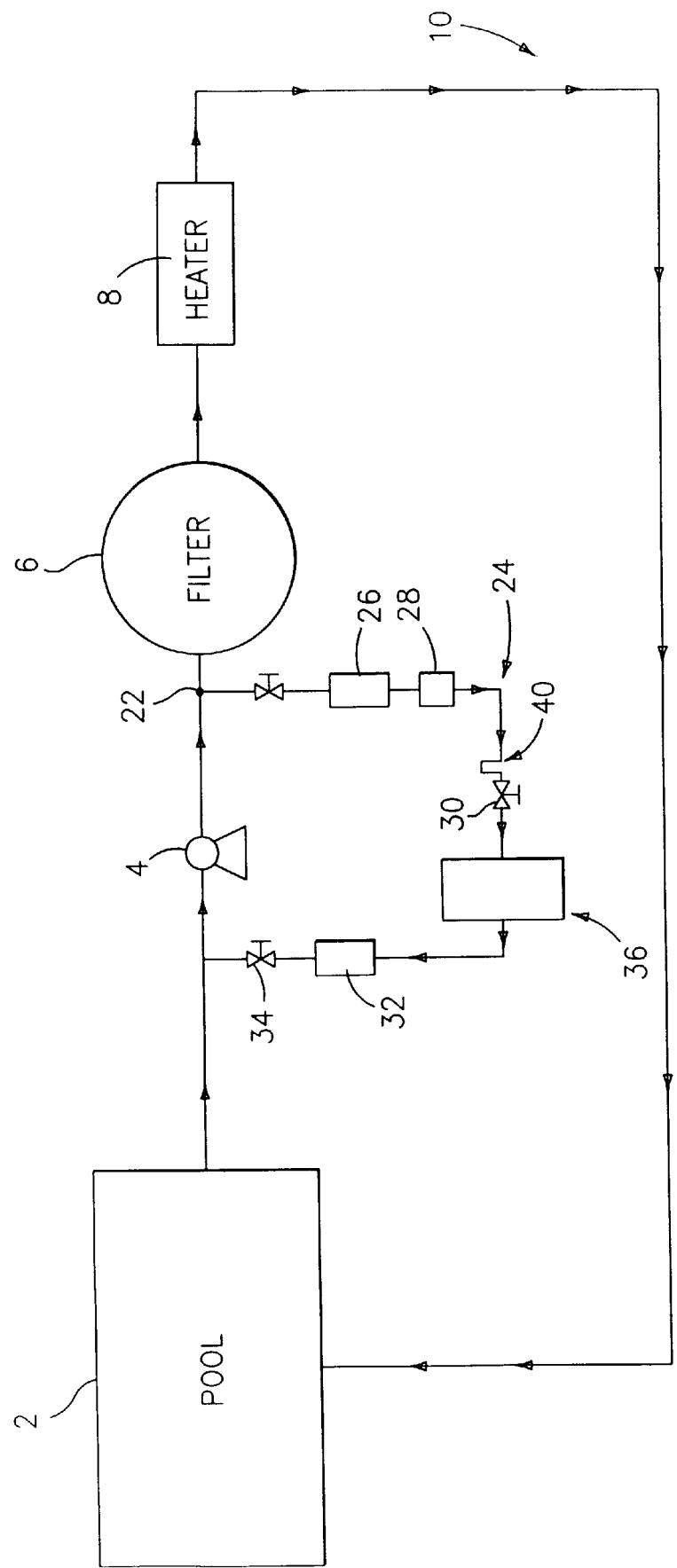
FIG. 2 shows a schematic view similar to FIG. 1, but showing a manually controlled embodiment of a swimming pool sanitizing system formed in accordance with this invention.

In the drawings, there is shown in FIGS. 1 and 2 schematic illustrations of automatic and manually operated pool water chlorinating systems, respectively, which are formed in accordance with this invention. Referring first to FIG. 1, the swimming pool is designated generally by the numeral 2. Water from the swimming pool 2 is circulated through a water treatment loop 10 by means of a recirculating pump 4. The recirculated water stream in the loop 10 passes through a filter 6 and a heater 8 before being returned to the pool 2. A portion of the recirculating pool water stream, as it leaves the pool 2, is drawn into a side sensor loop 12 by means of a booster pump 14. The water in the sensor loop 12 passes through a sensing chamber 16 where it is exposed to a pH sensor 18 and an oxidation-reduction sensor 18' which are each operably connected to a system microprocessor controller 20. In this manner the chlorine concentration in the recirculating water stream is monitored and the extant chlorine concentration is stored in the controller 20. Water in the sensor loop 12 re-enters the main recirculating water stream upstream of the recirculating pump 4.

An entry 22 to a chlorinating loop 24 is interposed between the pump 4 and the filter 6. The chlorinizing loop 24 includes a strainer 26, a flow indicator 28, a solenoid valve 30, a check valve 32, a ball valve 34, and a chlorinator assembly 36. The solenoid valve 30 is an on-off valve, and thus is either open or closed, and its condition is dictated by the microprocessor controller 20 via line 38. When the microprocessor controller 20 detects an undesirably low concentration of chlorine in the pool water via sensors 18 and 18', the controller 20 will automatically open the solenoid valve 30 so that a portion of the recirculating water stream will flow through the chlorinating loop 24 and the chlorinator assembly 36, wherein chlorine is added to the recirculating water stream. The freshly chlorinated water re-enters the recirculating water stream and is fed back into the pool via the recirculating loop 10. When the chlorine concentration in the pool water reaches an acceptable level as sensed by the sensors 18 and 18', the controller 20 closes the solenoid valve 30, and thus the chlorinating loop 24 to recirculating pool water. The concentration of chlorine in the pool water is thus automatically sensed and regulated in accordance with target chlorination concentrations which are reprogrammed into the controller 20. In certain cases wherein the needs of the water source will not drastically change during use, controlling the duration of the spray and the duration of the non-spray intervals can be preset, and can operate efficiently without the need of chlorination sensors or a system controller. The sensors 18 and 18', and the controller 20 are usually not needed in residential pool chlorination systems, and are recommended in larger commercial pool and drinking water chlorination systems.

FIG. 2 schematically illustrates a manually operable version of the pool sanitizing system of this invention. The components of the embodiment of FIG. 2 are similar to the components shown in FIG 1 with the exception that the controller and sensing loop are omitted, and the solenoid valve 30 is controlled by a manually actuable repeat cycle timer 40. The concentration of chlorine in the pool water is manually detected with a kit which one uses to sample the pool water. When the chlorine concentration is found to be undesirably low or high, the pool attendant actuates the timer 40 so as to open the solenoid valve 30 for a predetermined time period which will re-chlorinate the pool water to a target concentration, or in the case of too high a chlorination concentration, the attendant can actuate the timer 40 so as to skip one or more subsequent chlorination steps. The attendant can also manually preset the duration of the spray-on interval, and the spray-off interval for respective time periods which are proportional to the amount of chlorine needed to bring the chlorine concentration back up to, or back down to the desired concentration.

The manually operated embodiment of the system is also less costly and can be employed in smaller pools that are regularly serviced by an owner or a pool attendant, and the automatically operated embodiment of the system can be employed in larger pools or in public drinking water supply systems.

Figure 3:
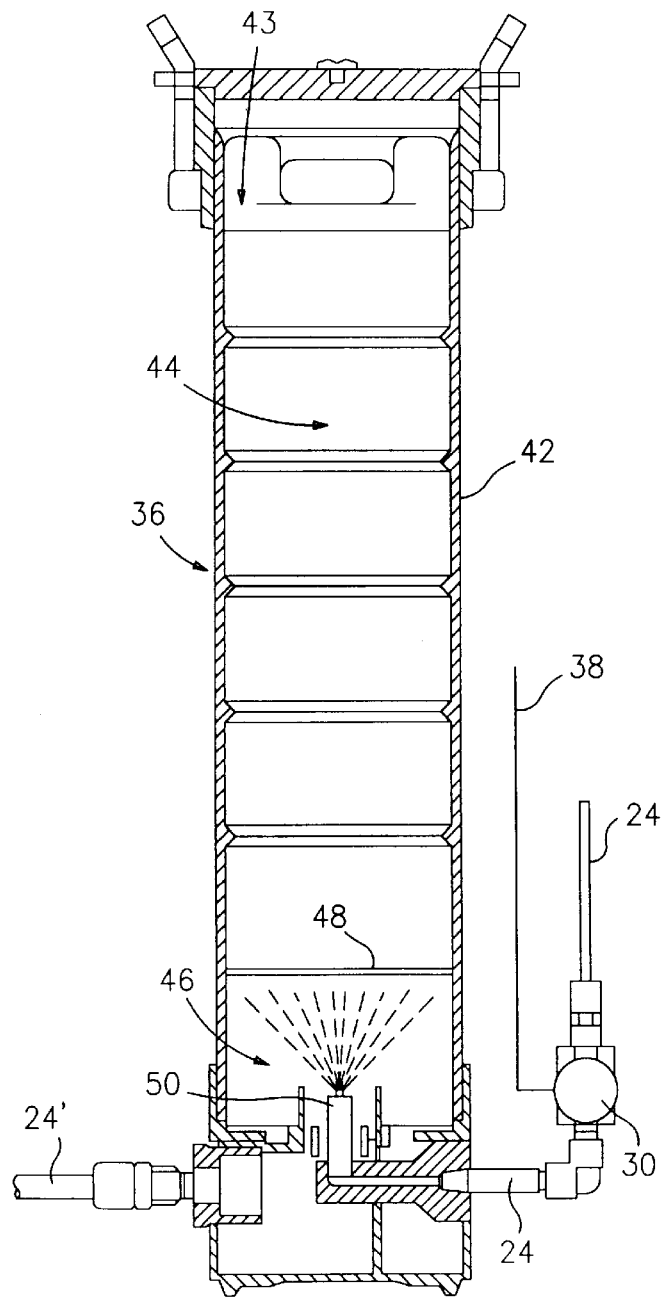
FIG. 3 shows a sectional view of one embodiment of a chlorinator assembly that is adapted for use in connection with either of the sanitizing systems of FIGS. 1 or 2.
Figure 4:
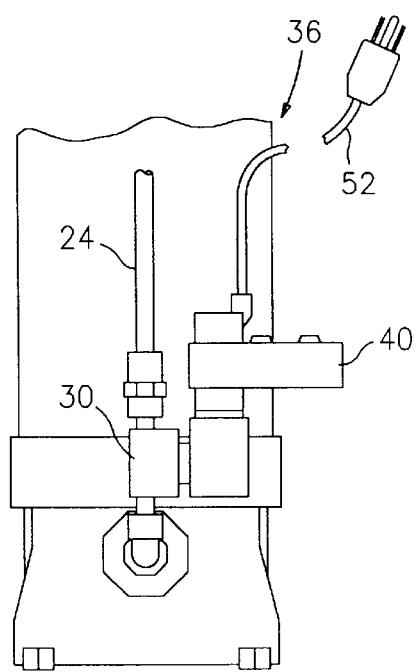
FIG. 4 shows a fragmented side elevational view of a portion of the chlorinator assembly of FIG. 3.

Referring now into FIGS. 3 and 4, details of a suitable chlorinator assembly 36 are shown. The chlorinator assembly 36 includes a cylindrical housing 42 having a removable closure cover 43, and which is divided into an upper chamber 44 and a lower chamber 46. The pool water chlorinating loop 24 enters the lower chamber 46, and an extension of the chlorinating loop 24' exits from the lower chamber 46. As previously noted, the solenoid valve 30 controls entry of water into the lower chamber 46, the valve 30 being connected to the controller 20 (not shown) via line 38. The valve 30 can also be directly connected to the repeat cycle timer 40 (shown in FIG. 2). A connection (a DIN or ISO connection) allows the repeat cycle timer to the plugged directly in to the valve 30. The upper and lower chambers 44 and 46 of the housing 42 are separated by a porous support gird 48. The lower chamber 46 contains a spray nozzle 50 that is operative to spray the support gird 48 with pool water. Electrical power is supplied to the assembly 36 via a power connection 52.

Figure 5:
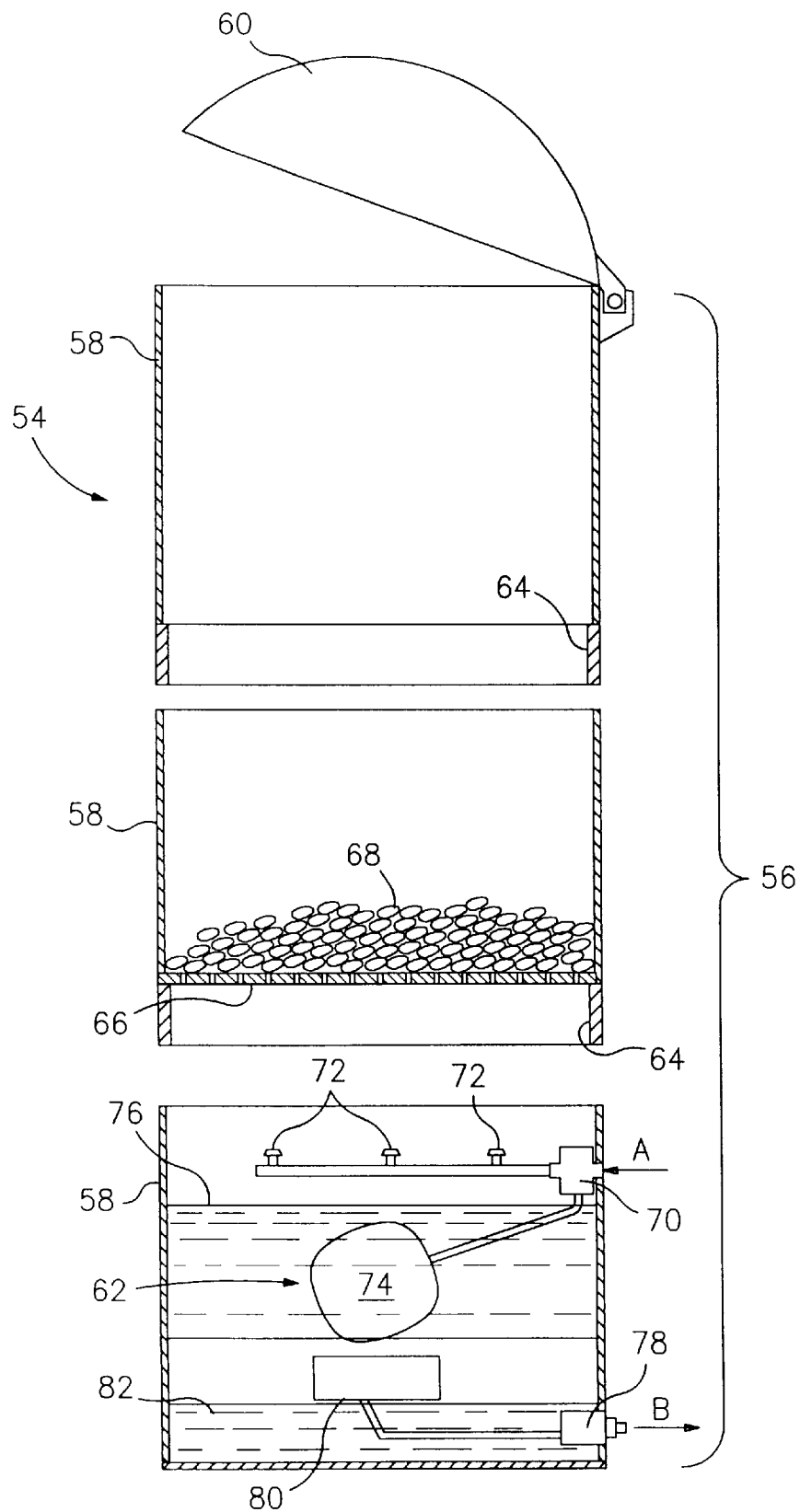
FIG. 5 shows a sectional view of a second embodiment of a chlorinator assembly that is adapted for use in connection with either of the sanitizing systems of FIGS. 1 or 2.

Referring now to FIG. 5, there is shown a modified embodiment of a chlorinator assembly 54 that is formed in accordance with this invention. The assembly 54 includes a cylindrical housing 56 comprising a plurality of stackable sections 58. A closable lid 60 is mounted on the uppermost section 58, and a water discharge/safety overflow valve assembly 62 is contained in the lowermost section 58. Each of the upper sections 58 will include an annular shelf 64 which facilitates stacking of the sections 58 one atop the other, and serves as a support for a porous grid or screen 66 on which the pool sanitizing chemical briquettes 68 are deposited. The water discharge/safety overflow valve assembly 62 includes a water inlet valve 70 that connects with one or more spray nozzles 72 that are operable to spray water upwardly through the grid 66 against the pellets 68. Water thus flows in the direction of the arrow A into the lowermost section 58 of the housing 56. A float 74 is connected to the inlet valve 70 and is operable to shut off the inlet valve 70 when the chlorinated water level reaches the point 76 (the high water level) in the lowermost section 58. A chlorinated water outlet valve 78 is also provided in the lowermost section 58 of the housing 56. The outlet valve 78 controls flow of chlorinated water out of the housing 56 in the direction of the arrow B. The outlet valve 78 is connected to a float 80, which is operable to close the valve 78 when the chlorinated water level reaches the point 82 (the low water level) in the lowermost section 58 of the housing 56. The assembly 54 thus has automatic water flow controls that ensure that the chlorinated water level in the lowermost section 58 remains at a volume that neither covers the spray nozzles 72, nor uncovers the chlorinated water outlet valve 78.

Figures 6, 7:
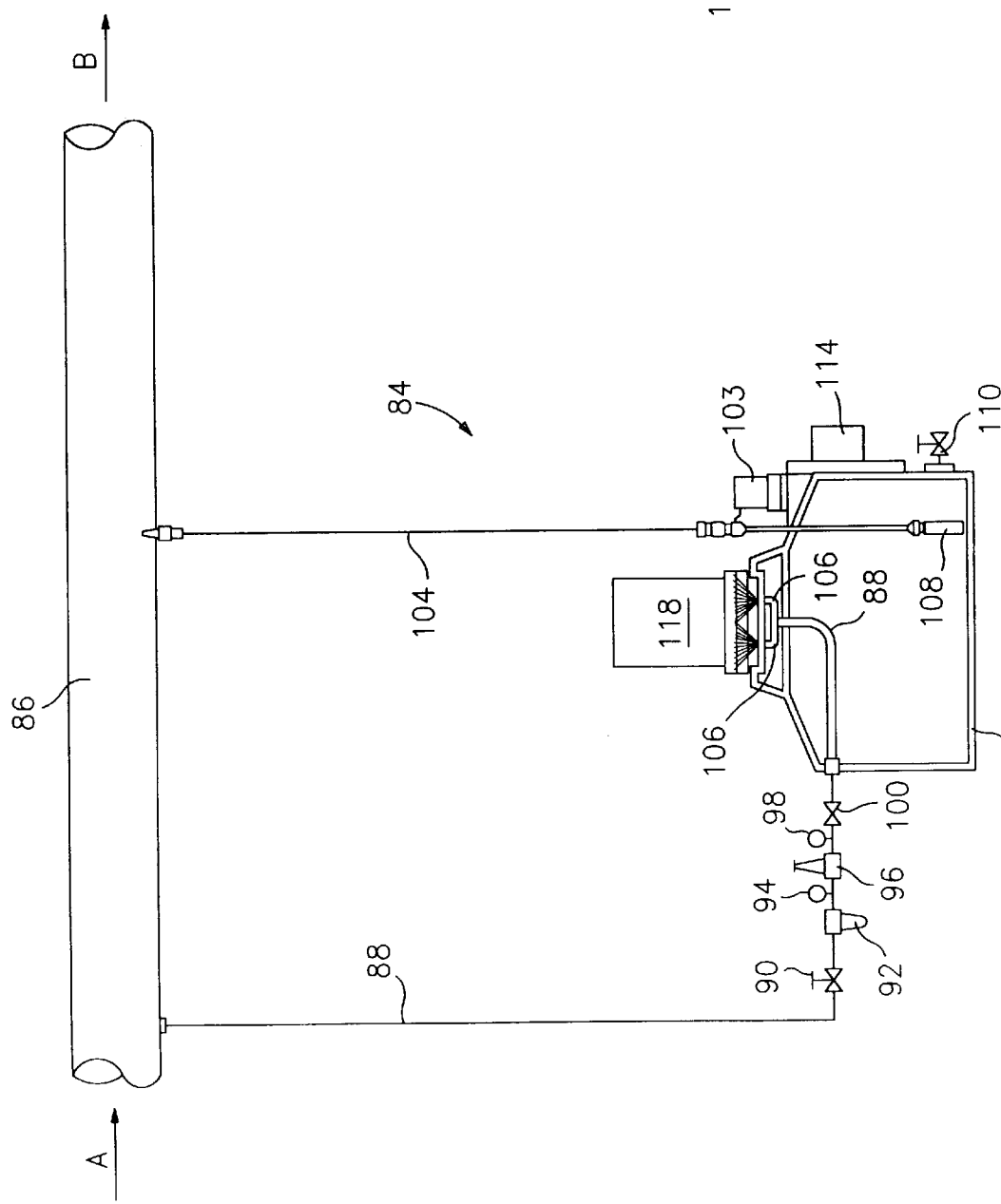
FIG. 6 shows a somewhat schematic elevational view of a drinking water chlorinating embodiment of the system of this invention.
FIG. 7 shows a schematic elevational view of the system of FIG. 6 as viewed from the right hand side of FIG. 6.

FIGS. 6 and 7 illustrate an embodiment of the invention that is adapted for use in sanitizing drinking water; industrial waste water effluent; or other water streams, by means of a single pass-through system that is denoted generally by the numeral 84. The water stream to be sanitized or cleaned up flows through the conduit 86. A bypass line 88 draws water off the conduit 86. The line 88 is equipped with a shutoff valve 90 that can be activated to stop the flow of water through the line 88 when the system 84 is to be cleaned, inspected, or the like. Downstream of the valve 90 are: a particulate filter 92; an inlet water stream pressure gauge 94; an inlet water stream pressure regulator 96; a water spray pressure gauge 98; and a periodically actuable solenoid valve 100. The purpose of the aforesaid components is to measure the pressure of the water stream flowing through the line 88; clean particulates out the water stream; and adjust the water pressure to a target pressure for the water sprays 106. A target spray pressure that we have deemed to be preferable is in the range of about fifteen psi to about twenty psi. Thus the aforesaid components are operable to produce the target spray pressure. The solenoid valve 100 is used to produce the intermittent spray. In the single flow through system shown in FIGS. 6 and 7, the spray cycle is kept constant, and is preferably twenty seconds on and thirty seconds off. This water spray interval will produce a solution of about 1.4% to about 1.5% chlorine-water solution in the tank 102. This chlorine-water solution is returned to the conduit 86 by a water pump 103 via line 104. The flow of chlorinated water from the tank 102 into the line 104 is enabled by a suction tube 108, which is suspended below the chlorinated water level in the tank 102. A drain valve 110 is included in the tank 102 for draining the tank 102 when the latter is to be cleaned or serviced. The tank 102 is equipped with a stirrer 112 which is operable to keep non-dissolved chemical particulates suspended in the tank water, so that the non-dissolved particulates will be swept out of the tank 102 and into the stream of water in the conduit 86 where the particulates will dissolve. The assembly 84 includes a microprocessor controller 114 that monitors the electrical equipment in the system such as the pressure gauges 94, 98 and the solenoid valve 100, and a float 116 is suspended in the tank 102 to monitor the water level in the tank 102. When the water level exceeds a predetermined value, the float 116 will shut off all of the water inlet enabling components so that additional water will be prevented from entering the tank 102 until the water level has receded to a second predetermined level, whereupon additional water will be fed into the tank 102. The solid chemical particulate is housed in a hopper 118, which can be periodically replenished with chemical.

It will be appreciated that the chlorinating system of this invention can be operated manually or automatically, depending upon the volume of water in the water source, and the degree of chlorination desired for the water source. The system of this invention can be used in a repetitive closed loop configuration, wherein the spray and interval durations can be changed, as described above to chlorinate swimming pool water; or in a single pass through open loop, wherein the spray and interval durations will preferably be kept constant, as described above to sanitize drinking water, or clean up waste effluent water.

The use of periodic water sprays directed against a solid chlorinating chemical mass provides an efficient water sanitization system. The intermittent water spray system allows the use of highly soluble chlorinating chemical briquettes or other solids, such as calcium hypochlorite, in the sanitization system, which highly soluble chemicals cannot realistically be utilized in any system wherein the chemical is immersed, even periodically, in a water bath.

The use of separate system housing sections allows custom sizing of the chlorinator assembly housing. Another advantage which is attained by the spray sanitization system of this invention, as previously discussed, is the direct result of the water spray velocities which can be attained in the system, and serve to limit scale formation on the assembly components. This advantage enables the use of calcium hypochlorite as the chlorinating chemical, since the calcium component of the hypochlorite chemical, and the alkalinity of the water, which is the result of carbonate and bicarbonate ions, combine to cause scale formation when the hypochlorite chemical is dissolved. In static sanitizing systems of the prior art, the resultant scale would require frequent removal, thus, less soluble chlorinating chemicals are used in the aforesaid static systems. While the invention has been described in connection with water chlorination systems, the system may also be utilized with non-chlorinating chemicals of high solubility to treat water for purposes other than chlorination.

Since may changes and variations of the disclosed embodiments of the invention may be made without departing from the inventive concept, it is not intended to limit the invention otherwise than as required by the appended claims.

What is claimed is:

1. An assembly for chlorinating water, said assembly comprising:
    a) a housing for containing a solid chlorinating chemical in the form of briquiettes, pellets, granules;
    b) a porous support grid disposed in said housing, said grid begin offset upwardly from a bottom portion of said housing, said grid having a first surface which is adapted to support a predetermined volume and weight of the solid chlorinating chemical;
    c) at least one water spray nozzle disposed in said housing, said nozzle being positioned below said grid on a side of said grid which is opposite to said first surface of said grid, said nozzle being sized and spaced apart from said grid a distance winch is operable to produce a water spray which will impact said grid at a grid-impact velocity of at least about thirty feet per second at a predetermined water pressure;
    d) first means for admitting a stream of water to be chlorinated to said water spray nozzle;
    e) second means for removing chlorinated water from said housing; and
    f) said first means including means for controlling the stream of water io said water spray nozzle so as to provide an intermittent water supply to said water spray nozzle whereby the chlorinating chemical will be subjected to intermittent sprays of water of controlled duration.

2. The assembly as claimed in claim 1 further comprising sensing means for sensing the chlorine concentration in the water in said housing, said means for sensing being operable to selectively control said first and second means thereby controlling the influx and efflux of water into and out of said housing.

3. An assembly for chlorinating water, said assembly comprising:
    a) a housing for containing a solid chlorinating chemical in the form of briquettes, pellets, granules;
    b) a porous support grid disposed in said housing, said grid begin offset upwardly from a bottom portion of said housing, said grid having a first surface which is adapted to support a predetermined volume and weight of the solid chlorinating chemical;
    c) at least one water spray nozzle disposed in said housing, said nozzle being sized and spaced apart from said chemical by a distance which is operable to produce a water spray which will impact said chemical at a chemical-impact velocity of at least about thirty feet per second at a predetermined water pressure;
    d) first means for admitting a stream of water to be chlorinated to said water spray nozzle;
    e) second means for chlorinated water from said housing; and
    f) said first means including means for controlling the stream of water to said water spray nozzle so as to provide an intermittent water supply to said water spray nozzle whereby the chlorinating chemical will be subjected to intermittent sprays of water of controlled duration.

4. An assembly for chlorinating water, said assembly comprising:
    a) a housing for containing a solid chlorinating chemical in the form of briquettes, pellets, granules;
    b) a porous support gird disposed in said housing, said grid being offset upwardly from a bottom portion of said housing, said grid having a first surface which is adapted to support a predetermined volume and weight of the solid chlorinating chemical;
    c) a plurality of water spray nozzles disposed in said housing, said nozzles begin positioned below said grid on a side of said grid which is opposite to said first surface of said grid, said nozzles being sized and spaced apart from said grid a distance which is operable to produce a plurality of water sprays which will impact said grid at a gird-impact velocity of at least about thirty feet per second at a predetermined water pressure;
    d) first means for admitting a stream of water to be chlorinated to said water spray nozzles;
    e) second means for removing chlorinated water from said housing; and
    f) said first means including means for controlling the stream of water to said water spray nozzles so as to provide an intermittent water supply to said water spray nozzles whereby the chlorinating chemical will be subjected to intermittent sprays of water of controlled duration.

5. An assembly for chlorinating water, said assembly comprising:
    a) a housing for containing a solid chlorinating chemical in the form of briquettes, pellets, granules;
    b) at least one water spray nozzle disposed in said housing, said nozzle being sized and spaced apart from said chemical by a distance which is operable to produce a water spray which will impact said chemical at a chemical-impact velocity of at least about thirty feet per second at a predetermined water pressure;
    c) first means for admitting a stream of water to be chlorinated to said water spray nozzle;
    d) second means for removing chlorinated water from said housing; and
    e) said first means including means for controlling the stream of water to said water spray nozzle so as to provide an intermittent water supply to said water spray nozzle whereby the chlorinating chemical will be subjected to intermittent sprays of water of controlled duration.

6. An assembly for chlorinating water, said assembly comprising:
    a) a housing for containing a solid chlorinating chemical in the form of briquettes, pellets, granules;
    b) a porous support gird disposed in said housing, said grid being offset upwardly from a bottom portion of said housing, said grid having a first surface which is adapted to support a predetermined volume and weight of the solid chlorinating chemical;

c) at least one water spray nozzle disposed in said housing, said nozzle being sized and spaced apart from said chemical by a distance which is operable to produce a water spray which will impact said chemical at a chemical-impact velocity of at least about thirty feet per second at a water pressure in the range of about fifteen to twenty psi;

d) first means for admitting a stream of water to be chlorinated to said water spray nozzle;;

e) second means for removing chlorinated water from said housing; and f) said first means including means for controlling the stream of water to said water spray nozzle so as to provide an intermittent water supply to said water spray nozzle whereby the chlorinating chemical will be subjected to intermittent sprays of water of controlled duration.

7. The assembly of claim 6 wherein said first means also includes means for lowering the water pressure of an incoming stream of water to said water pressure range of about fifteen to twenty psi.

8. The assembly of claim 6 further comprising sensing means for sensing the level of chlorinated water in said housing, said means for sensing being operable to selectively control said first and second means thereby controlling the influx and efflux of water into and out of said housing.

9. A method for producing a supply of chlorinated water, said method comprising the steps of:

a) providing a quantity of a solid chlorinating chemical, said chemical having a solubility of at least about ten grams per hundred milliliters of water; and b) directing an intermittent spray of water against said chemical at an impact velocity of at least about thirty feet per second so as to abrade and dissolve said chemical with said water spray thereby providing a consistent, reproducible supply of chlorinated water.

10. The method of claim 9 wherein said chemical is calcium hypochlorite.

11. A method of producing a supply of chemically treated water, said method comprising the steps of:

a) providing a quantity of a solid water-treatment chemical, said chemical having a solubility of at least about ten grams per hundred milliliters of water; and b) directing an intermittent spray of water against said chemical at an impact velocity of at least about thirty feet per second so as to abrade and dissolve said chemical with said water spray thereby forming a supply of chemically treated water.

12. The assembly as claimed in claim 2 wherein the first (d) comprises:

an overflow valve assembly.

13. The assembly as claimed in claim 12 wherein the second means (e) comprises:

an outlet valve.

14. The assembly as claimed in claim 13 wherein the overflow valve assembly comprises:

an inlet valve.

15. The assembly as claimed in claim 14 wherein the sensing means comprises:

a pH sensor.

16. The assembly as claimed in claim 7 wherein the means for lowering the water pressure comprises:

a pressure gauge;

a regulator; and a solenoid valve.

* * * * *